Dec. 11, 1923.
C. P. SPECK
1,477,085
DEPOSITOR FOR CONFECTION MAKING APPARATUS
Filed June 27, 1921
2 Sheets-Sheet 2
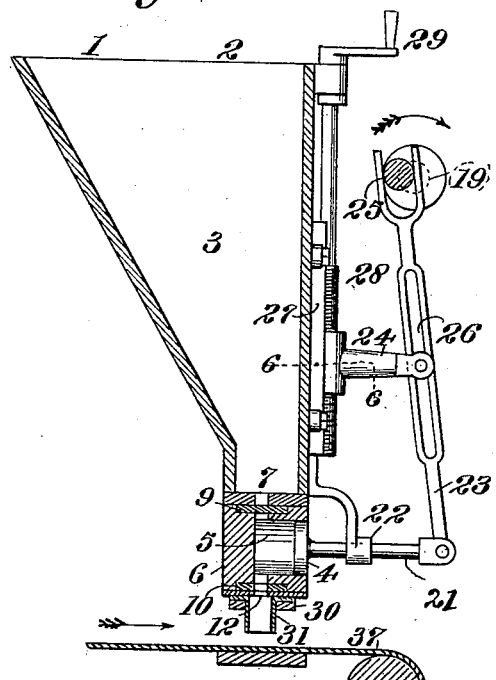
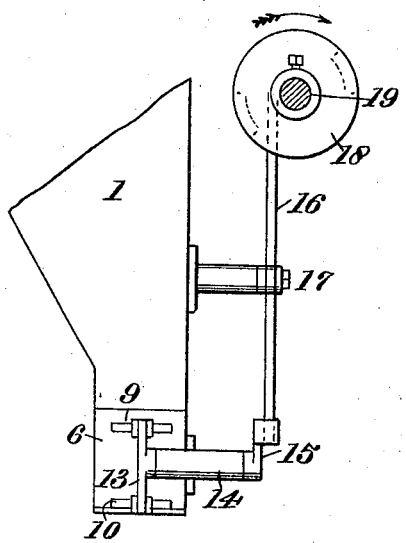
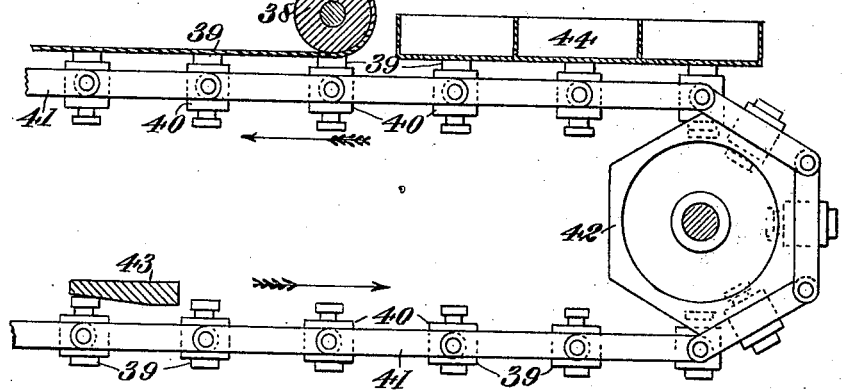
Inventor,
C.P. Speck
By Acker + Tolle
Attorneys Patented Dec. 11, 1923.

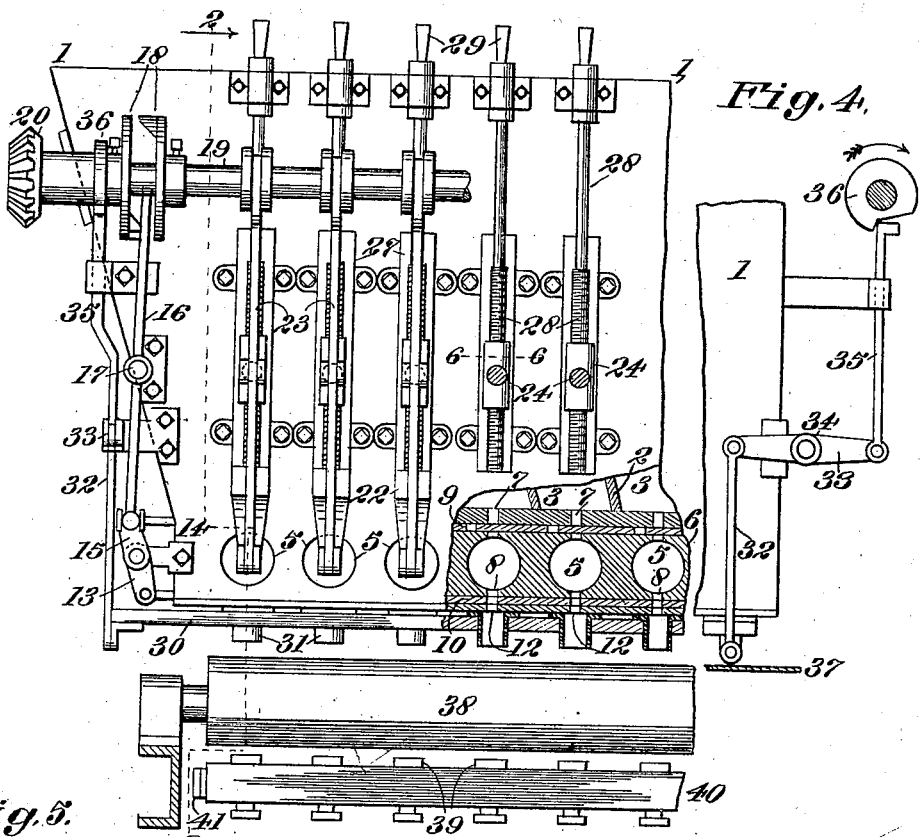

1,477,085

UNITED STATES PATENT OFFICE.

CLIFFORD P. SPECK, OF OAKLAND, CALIFORNIA.

DEPOSITOR FOR CONFECTION-MAKING APPARATUS.

Application filed June 27, 1921. Serial No. 480,767.

*To all whom it may concern:*

Be it known that I, CLIFFORD P. SPECK, a citizen of the United States, residing at the city of Oakland, in the county of Alameda and State of California, have invented certain new and useful Improvements in Depositors for Confection-Making Apparatus, of which the following is a specification.

The present invention relates to candy making machines, and more particularly to means for automatically depositing candy filling material in molds.

The subject matter of my present invention was disclosed broadly in my application for United States Patent Serial No. 381,849, filed May 17th, 1920, which has become Patent No. 1,451,031, dated April 10, 1923, for candy making apparatus, and its general objects and advantages were therein set forth. The present application, however, relates more specifically to mechanism for successively removing controllable quantities of candy filling material from a supply thereof, and depositing the same within suitable molds, which may or may not have previously received a lining of chocolate or other material, according to whether the finished candy is to be coated or not.

The objects of the present invention are to provide such mechanism which is capable of performing its functions accurately and without waste, and which may be adjusted to deposit any required amount of filler demanded by the size of the finished product.
With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

With this in view, one embodiment of my invention will now be fully described with reference to the accompanying drawings, wherein:—

Figure 1 is a broken part sectional front view of my depositing apparatus.

Figure 2 is a vertical section of the same, taken on the line 2—2 of Figure 1, and viewed in the direction of the arrows.

Figure 3 is a detailed side elevation of the gate operating mechanism.

Figure 4 is a detailed side elevation of the transferring mechanism.

Figure 5 is a vertical sectional detail, enlarged, of the transferring mechanism.

Figure 6 is a horizontal sectional detail, enlarged, of one of the feed adjusting devices, taken in the direction of the arrows, on the line 6—6 of Figure 2.

In the drawings, the reference numeral 1 designates a bin, which is divided by vertical partitions 2. Figs. 1 and 2, into a series of hoppers 3 adapted to contain supplies of the candy filling material. Each of said hoppers has at its bottom a valve controlled outlet for said filler. These valves are independently adjustable, but are all actuated by a common mechanism, and are all identical in construction and operation, so that a description of one will suffice for all.

Beneath each hopper 3 is a horizontally operable piston 4, working in a cylinder 5 formed in the bottom member 6 of the bin 1. Said cylinder communicates with the hopper 3 by an opening 7, and has a downwardly directed discharge opening 8, said openings being respectively controlled by sliding valves 9 and 10, which are common to all the hoppers, extending transversely the entire length of the bottom bin member 6, and having openings 11 and 12 adapted to register respectively with the cylinder openings 7 and 8. The slide valves 9 and 10 are reciprocally operated by a lever 13, Figures 1 and 3, with which their ends are connected. Said lever is fixed upon a short shaft carried in a journal bracket 14, Figure 3, and the outer end of said shaft has an arm 15 which is operated by a lever 16, Figures 1 and 3, fulcrumed at 17, and having its upper end lying between two opposite face cams 18, fixed upon a rotating horizontal shaft 19. Said shaft 19 carries a bevel gear 20, Figure 1, by means of which it may be rotated by any suitable mechanism, not shown in the drawings. Thus it will be seen that the slide valves 9 and 10 are simultaneously and oppositely reciprocated, one moving in and the other out, and the openings 11 and 12 in said valves are so positioned that the cylinder feed openings 7 are open when the discharge openings 8 are closed, and vice versa.

Each piston 4 is actuated by a rod 21, Figure 2, sliding in a guide 22, and connected with the lower end of a lever 23 which is fulcrumed upon an adjustable bracket 24, and whose upper end is bifurcated and adapted to embrace a crank pin 25 carried by the horizontal shaft 19. Said crank pins 25 are so positioned upon the shaft 19 that the pistons 4 are moved out while the feed apertures 7 are open, thus drawing charges of filler from the hoppers 3 into the cylinders 5, and are moved in when the discharge apertures 8 are open, thus discharging said filler through said apertures 8.

Each piston operating lever 23 is slotted, as shown at 26, Figure 2, and the fulcrum bracket 24 is mounted for vertical movement in a grooved guide 27, Figures 2 and 6, secured to the front wall of the bin 1. A screw-threaded vertical shaft 28, Figures 1, 2 and 6 passes through and engages the base of the fulcrum bracket 24, and is provided with a crank handle 29 at its upper end. Thus by turning the shafts 28 by means of their handles 29, the fulcrum brackets 24 may be moved up or down, to vary the stroke of the pistons 4 and regulate the amounts of filler drawn from the hoppers 3 at each stroke.

Beneath the bottom member 6 of the bin 1 is a vertically movable transverse bar 30, Figures 1, 2 and 5, in which are fixed a series of transfer tubes 31, one positioned beneath each cylinder discharge aperture 8. The bar 30 is moved up and down by links 32, Figures 1 and 4, positioned at each end of said bar and connected with levers 33, fulcrumed at 34, Figure 4, and having push rods 35 actuated by cams 36 mounted on the horizontal shaft 19. In the drawings I have shown such mechanism at one end only of the bar 30, but it is understood that a similar mechanism is positioned at its other end. Thus the bar 30 is raised by the cams 36 depressing the push rods 35 and elevating the links 32 through the levers 33. The weight of said bar 30 holds it in the lowest position permitted by the cams 36.

The function of the bar 30 with its transfer tubes 31 is to transfer successive charges of filler from the cylinder discharge apertures 8 to an intermittently traveling belt 37, Figures 1, 2 and 5, whose width extends across beneath all said transfer tubes. An end roller 38, over which said belt passes, is shown in Figs. 2 and 5, but the remainder of said belt, and its operating mechanism, is omitted from the drawings for the sake of clearness. The movements of the bar 30 are so timed relatively to those of the valves and pistons that the tubes 31 are in their upper positions, as shown in Figs. 1 and 2, and in full lines in Fig. 5, when the discharge valve 10 opens and the charges of filler are poured by the pistons 4 through the apertures 8 into said tubes 31. Immediately thereafter the bar 30 descends until the lower ends of the tubes 31 come into contact with the surface of the belt 37, which is at rest at this time. On account of the viscosity of the filling material, and the diameter of the tubes 31, the charges of said filler leave the tubes 31 when the latter are again moved up, and, adhering to the belt 37, remain thereupon as small masses or drops of the shape of the discharge end of the tube. The tubes 31 move down into contact with the belt 37 immediately succeeding the discharge of the filler from the apertures 8, and regulate the belt surface to be covered with filler charges.

The belt 37 carries the drops of filler, not shown in the drawings, in the direction of the arrow in Fig. 2 by a succession of step movements, and deposits them successively within molds 39—Figs. 1 and 2, which are mounted in cross bars 40 carried by side chains, one of which is shown at 41, the whole comprising a conveyer for said molds. An end sprocket is shown at 42, over which said conveyer passes, but the remainder of said conveyer and its propelling mechanism are omitted from the drawings for the sake of clearness. Said sprocket 42 is so positioned relatively to the belt roller 38 that the lower run of said belt rests upon the tops of the molds 39. It is to be understood, moreover, that the movements of the shaft 19, the belt 37, and the mold conveyer 41 are so timed that the drops of filler which are deposited on said belt, while the same is at rest, are carried forward and accurately placed within the molds carried by the conveyer.

The molds themselves, except in their relation to the depositing mechanism above described, form no part of the present invention; they may be of any suitable form, preferably similar to that shown and described in my said application Serial No. 381,849. I have indicated, at 43 in Figure 2, means for ejecting the finished candies from the molds, said means being similar to that described in my said prior application, and at 44 a heating means, comprising pans for containing hot water, for heating the edges of the chocolate coating, in case such has been previously placed in the molds. Said ejecting and heating means, however, form no part of the present invention.

It will be apparent from the foregoing description that the quantity of filler forced out by each piston 4 can be very closely regulated, and that the several pistons may be adjusted to various quantities, so that one row of molds 39 in the conveyer 41 may be filled with large candies and another with small candies, and as many different sizes may be made as there are units in the mechanism. Moreover, on account of the divisions in bin, different qualities or flavors of filler may be used simultaneously.

Having thus described my invention, what I claim as new and desire to secure by Letters Patent is:—

1. In a depositor for candy making apparatus having a movable mold and a holder for containing a supply of filler material, means for removing a charge of material from said holder, and devices including a movable open ended tube and an endless belt for receiving said charge from the removing means and transferring the same to the mold.

2. In a depositor for candy making apparatus having a mold and a holder for containing a supply of filler material, means for removing a charge of material from said holder, said removing means having a discharge opening in alignment with and spaced above the mold, a movable transfer part co-operating with said mold, and a movable open ended tube positioned between said discharge opening and said mold and adapted to receive said charge from the former and convey it to the said part for delivery thereby to the mold.

3. In a depositor for candy making apparatus having a mold and a holder for containing a supply of filler material, means for removing a charge of material from said holder, said removing means having a discharge opening in alignment with and spaced above the mold, a movable transfer part co-operating with said mold, a movable open ended tube positioned between said discharge opening and said part and adapted to receive said charge from the former and convey it to the said part for delivery thereby to the mold, and mechanism for operating said part, said removing means and moving said tube in timed relation.

4. In a depositor for candy making apparatus having a movable mold and a holder for containing a supply of filler material, means for removing a charge of material from said holder, a conveyer belt for placing said charge within the mold, and a movable open ended tube adapted to receive said charge from the removing means and to deposit the same upon said conveyer belt.

5. In a depositor for candy making apparatus having a movable mold and a holder for containing a supply of filler material, means for removing a charge of material from said holder, a conveyer belt for placing said charge within the mold, a movable open ended tube adapted to receive said charge from the removing means and to deposit the same upon said conveyer belt, and mechanism for operating said removing means and said conveyer belt and for moving said tube in timed relation.

6. In a depositor for candy making apparatus having a plurality of molds and a holder adapted to contain a supply of filler material, a plurality of simultaneously operating means for removing charges of filler from said holder, one corresponding to each mold, a conveyer belt, common to all said molds, for placing the charges therewithin, and devices for receiving said charges from the removing means and simultaneously depositing the same upon said conveyer belt.

7. A depositor for candy making apparatus comprising a holder for containing a supply of filler material, a base member for said holder having a cylinder formed therein with inlet and discharge openings, valves for controlling said openings, a drive shaft, a crank on said shaft, a lever having its ends respectively connected with said crank and said piston, and a fulcrum for said lever positioned between its ends, said fulcrum being adjustable to vary the stroke of said piston.

In testimony whereof I have signed my name to this specification.

CLIFFORD P. SPECK.